Jan. 13, 1970  G. ZOCCA  3,488,893
DEVICE FOR ARRANGING AND POSITIONING AUTOMATICALLY THE
WORKPIECES ON THE MACHINE
Filed Jan. 11, 1967  6 Sheets-Sheet 1

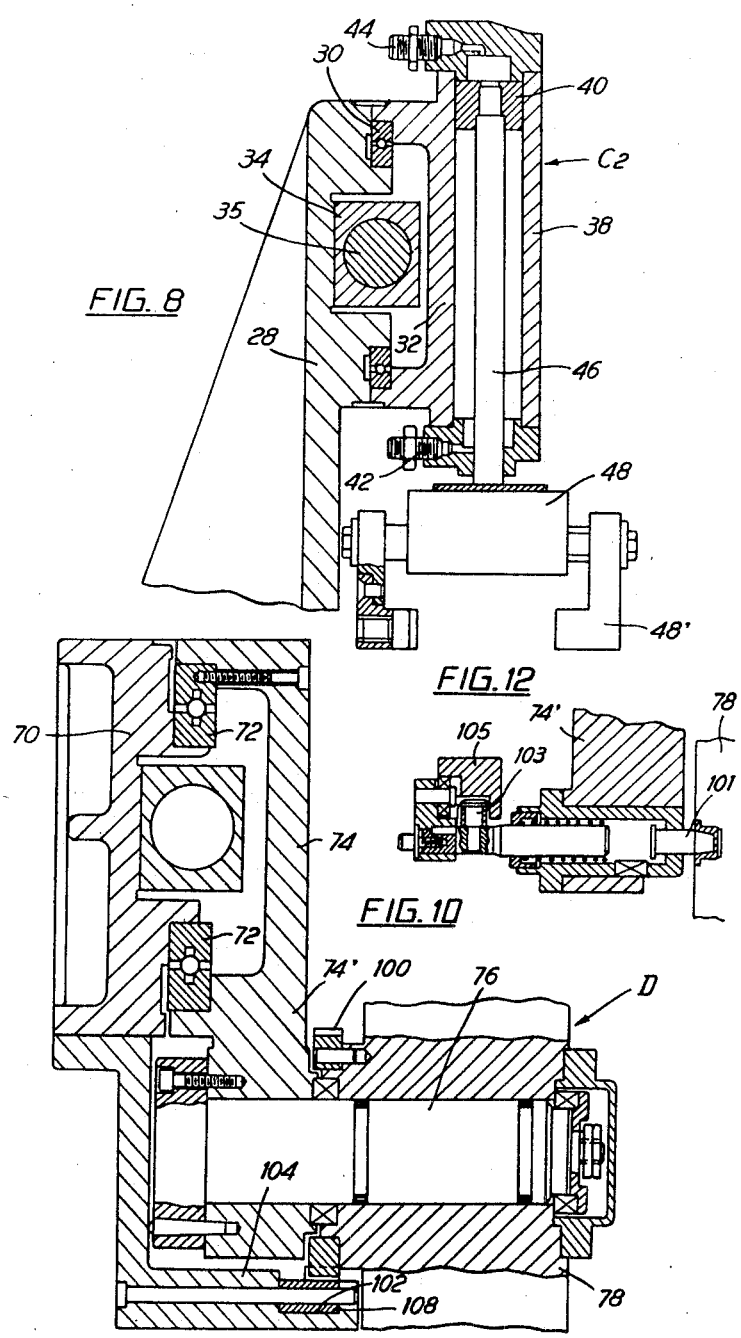

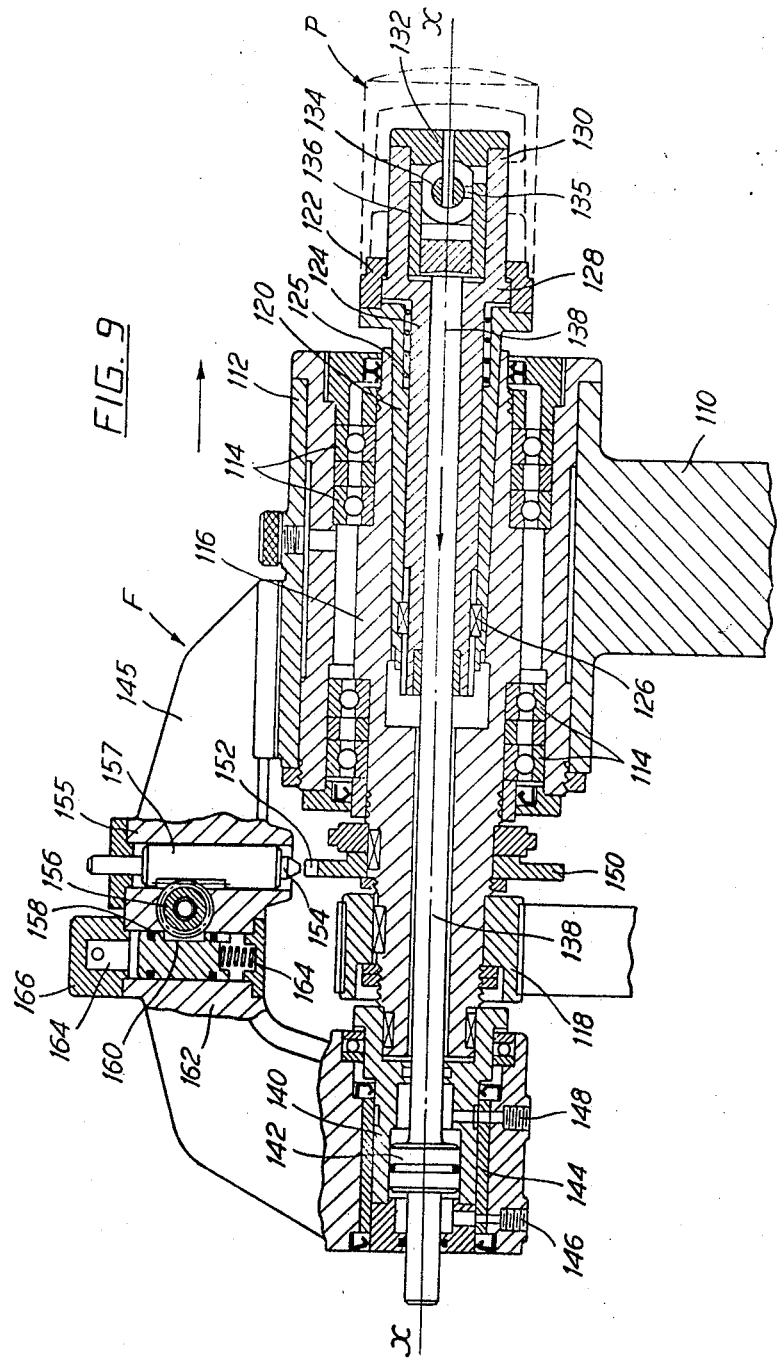

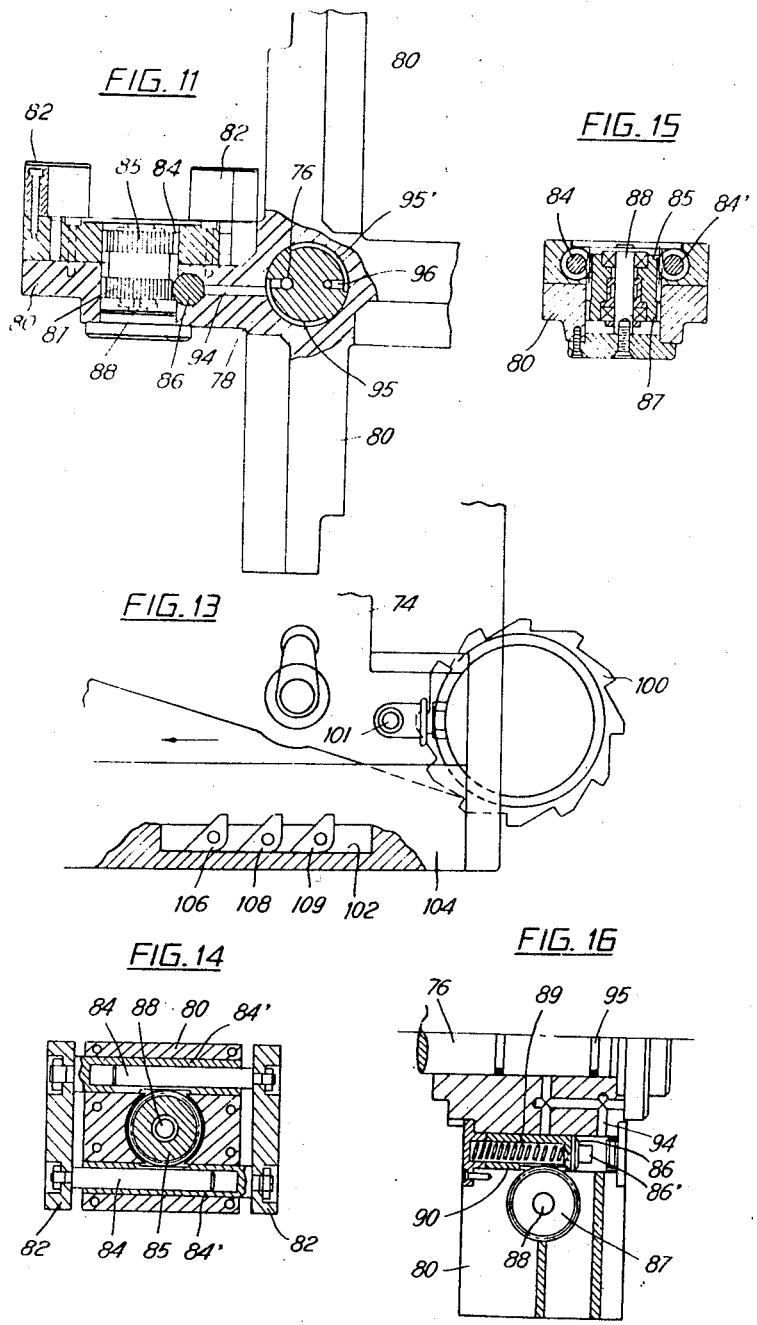

United States Patent Office 3,488,893
Patented Jan. 13, 1970

3,488,893
DEVICE FOR ARRANGING AND POSITIONING AUTOMATICALLY THE WORKPIECES ON THE MACHINE
Gaetano Zocca, Camerlata, Como, Italy
Filed Jan. 11, 1967, Ser. No. 608,601
Claims priority, application Italy, Jan. 22, 1966, 13,721/66
Int. Cl. B24b 47/02; B25j 3/00
U.S. Cl. 51—215       13 Claims

ABSTRACT OF THE DISCLOSURE

A machine tool including means for automatically placing and positioning workpieces on a mandrel for the machining thereof. The same includes first and second conveyor means for feeding the workpieces to and from a work station, respectively, first transfer means for transferring the workpieces from the first conveyor to the work station and second transfer means for transferring the machined workpieces from the work station to the second conveyor.

---

The present invention concerns a device applicable to machine tools in general, for which the workpiece has to be oriented in a given position in order to be locked on the machine mandrel. For example, the invention may involve the arrangement and the removal of the workpieces on turning, grinding, milling machines and the like. When the machining of pistons is being effected, for example, those for internal combustion engines, they must exhibit a suitable peripheral shaping due to the induced thermal and mechanical stresses during the engine operation. The piston, for instance, must show an ovalization, or more precisely, ellipticity, which value changes axially from the bottom to the head of the piston; moreover, said pistons must show a longitudinal, conical or barrel-like outline.

Obviously in the case of pistons with elliptical outline, the ellipse's greater and smaller axes must be arranged in a determined position with respect to the piston pinhole. Therefore this involves that the piston (and generally the workpiece) is to be arranged on the mandrel of the considered machine tool in such a well determined angular position as to allow the tool during the rotation of said mandrel to afford to the workpiece the due circumferential outline.

An object of this invention is to provide a device for transferring and positioning workpieces such as pistons in correspondence with the mandrel of the machine tool. Such pistons must be machined with a circular or closed outline which is precisely determined with respect to reference marks occurring angularly in the workpiece.

The device according to the invention is a machine tool including means for automatically placing and positioning workpieces on the mandrel of the tool comprising first and second conveyors for unmachined and machined workpieces placed above the work holder mandrel of the machine tool; a first transfer member positioned between the discharge end of the first conveyor and the charge end of the second conveyor, said transfer member including three vertically movable clamping and positioning units in order to position and transfer the machined piece and the one to be machined; a transfer member actuated by a reciprocating and rotary motion interposed between said reciprocating transfer member and the work holder mandrel, said straight line-rotary transfer member being provided with supports for the workpieces and with control means for imparting to said supports a controlled rotation in relation to the traverse direction of said transfer means, so that the workpieces drawn by the first of said conveyors will be positioned angularly and arranged with their axes in alignment with the mandrel axis in order to be caught and held by the mandrel in a pre-established angular position and subsequently machined.

Obviously the present invention covers also the machine tool too as a turning, a grinding, a milling machine, and the like, including the device according to the invention for positioning angularly and for arranging and removing automatically the workpieces and the machined products on and from the mandrel of said machine. Said mandrel, of the kind suitable for the workpiece, is equipped with means for positioning angularly every time the members which clamp and hold said workpiece and with control means for actuating said first means and whose action is co-ordinated with the means which allow the clamping members for the workpiece to rotate, in order that when these latter stop they will be automatically positioned angularly for receiving the workpiece brought to said clamping members by the device according to the invention for machining it.

The invention will now be explained with reference to a suitable application of the device to a grinding machine for pistons of internal combustion engines; said application being given only by way of illustration and not by way of limitation of the scope of the invention. The following description refers to the enclosed drawings wherein:

FIGURE 8 is a cross sectional view of the transfer member shown in FIGURE 7.

FIGURE 9 is the axial section of the work holder mandrel.

FIGURE 10 is an axial section of the reciprocating rotary transfer member.

FIGURE 11 is across sectional view of the transfer member shown in FIGURE 10 taken on the axis of rotation.

FIGURE 12 is a longitudinal section of the blocking device of the transfer member shown in FIGURE 10.

FIGURE 13 shows the device imparting rotation to the transfer member shown in FIGURE 10.

FIGURE 14 is a plan view of the blocking member on the piece positioned on the device shown in FIGURE 13.

FIGURE 15 is a cross sectional view of the blocking member shown in FIGURE 14.

FIGURE 16 is a cross sectional view of the blocking member shown in FIGURE 14.

Figure 1:
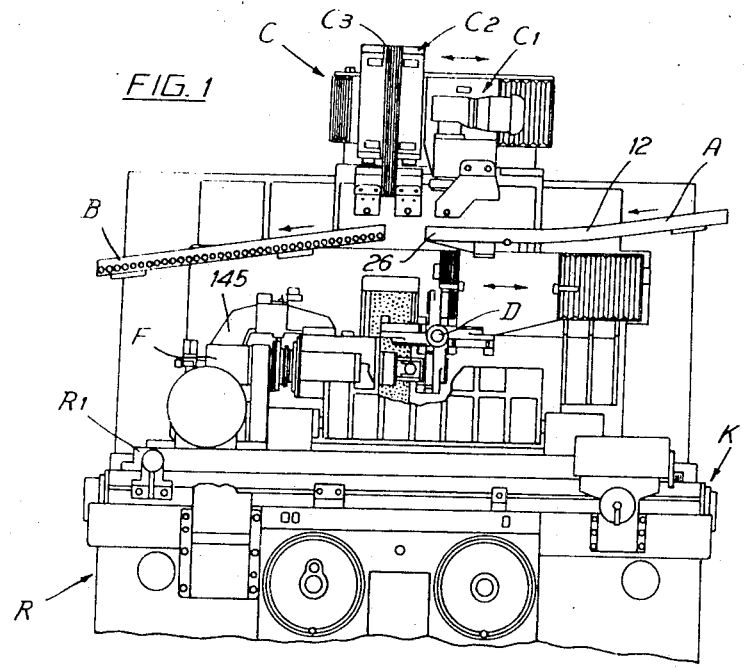
FIGURE 1 is a front elevation view of a grinding machine for pistons, the machine being equipped with the device according to the invention.

With reference to FIGURE 1, the upper portion of the grinding machine is provided with the device according to the invention, which feeds automatically pistons P or similar cylindrical bodies to the work holder mandrel of the grinding machine. The device comprises a feeding conveyor A and a discharge conveyor B for pistons P. Said conveyors are aligned with one another and arranged so that their common longitudinal center is substantially inclined and parallel to the axis of the mandrel F of the grinding machine.

The discharge and charge ends of both conveyors A and B are suitably spaced and between them is positioned a first transfer member C of the reciprocating motion type. Between said transfer member and the work holder mandrel F of the grinding machine, a second transfer member D of the rotary reciprocating kind, is arranged.

Pistons P are placed at the inlet of conveyor A with their axes horizontal and, as they gradually progress, a shaped housing sets them upright so that their axes are vertical.

Transfer member C is fitted with means $C_1$ for positioning in the proper direction the piston pin axis, with other means $C_2$ for transferring the piston on the member D and this in its turn on mandrel F. Once machined, said piston is removed from the mandrel F by the member D, while the further means $C_3$ provided by the member C transfers it from the member D to the discharge conveyor B.

The conveyor A, shown in FIGURE 1, is of the chute kind having a flat bottom with a hydraulically controlled latch in its end portion. The conveyor is connected with a suitably shaped and inclined housing 12, ending in a platform 26 with spring dampers upon which rest the pistons which are to be ground.

Figure 7:
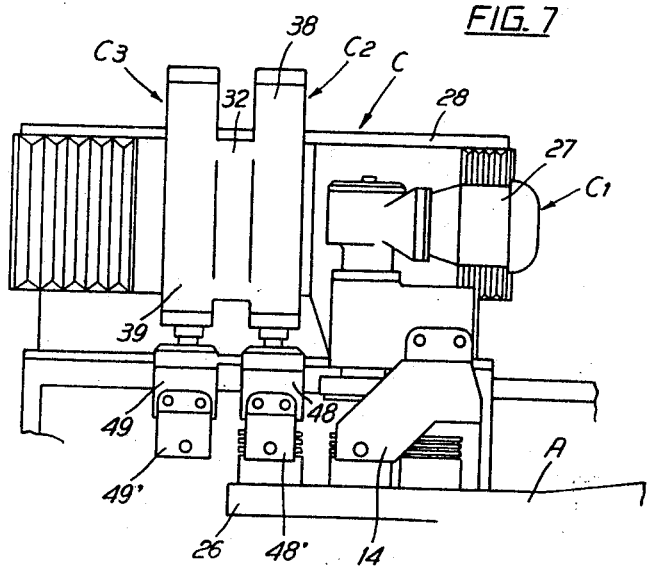
FIGURE 7 is a front elevational view of the reciprocating transfer member placed between the conveyors feeding and removing the pistons.

The reciprocating motion transfer member C is illustrated in FIGURES 7, 8 and comprises a bracket frame 28 showing upper horizontal guides 30 for a carriage 32 sliding thereon with back and forth motion parallel to and above the final and initial sections of both already considered conveyors A, B. Said truck has a control cylinder 34 supported by the bracket 28, wherein a piston 35 associated with carriage 32 slides for imparting to this latter a motion in either direction along the guides 30.

Carriage 32 holds also three cylinder-piston elements with vertical and parallel axes intersecting the axis of the grinding machine mandrel F whose functions have been previously specified.

Element $C_1$ involves (FIGURES 2-3-4-5-6) a system of double clamps 14 whose closure is caused by a fluid under pressure acting on a piston 15 whose toothed stem 15' puts in rotation, through the crown gear 16, a pin 20 carrying a second toothed wheel 19 driving a couple of toothed axes 17, 18 associated with the clamps 14.

Said clamps have shaped surfaces 21, matchable with the surfaces defining the piston pin hole. Element $C_1$ comprises moreover a cylinder 23 for a hydraulically controlled annular piston 22, inside which a rod 24 is inserted, coupled with a small electric motor 27 with a worm screw helical gear device 27'. Said rod 24 carries at its other end a disc 24 facing a rotating platform 26 which is provided at the end of the conveyor A.

Cylinder-piston elements $C_2$, $C_3$ are similar so only one thereof will be described, parts of one being designated by even numbers while corresponding parts of the other are designated by odd numbers.

Cylinder 38 (39) of each one of cylinder-piston units $C_2$ and $C_3$ is integral with carriage 32; the associated piston 40 (41) defines therein pressure chambers connected through joints 42, 44 to a pressure fluid distributor (not shown).

Piston rod 46 of said cylinder-piston units is operatively connected to a head 48 (49). The operation of said head is that of grasping the workpiece by means of suitable clamps 48' (49) which are constructed like that already described for clamps 14.

Heads 48, 49 are lowered when a fluid under pressure is introduced in the upper chamber of cylinder 38 (39) and brought near the transfer member D. When the same fluid operates in the lower chamber the piston rod rises and therewith the associated heads.

Considering now FIGURES 10-11-12-13-14-15-16, the structure of the rotary transfer member will now be described. Said member involves a guide plate 70 (FIGURE 10), secured to the frame of the grinding machine R so as to appear below and between the final and initial sections of conveyors A, B. Plate 70 has rectilinear guides 72 for a carriage 74 actuated by a back and forth motion, through proper controls constituted, for instance, by a hydraulic device or by a screw-nut arrangement that is like the control of carriage 32 of transfer member C. Guides 72 are parallel to the axis of the grinding machine mandrel F and are therefore also parallel to the final and initial sections of both conveyors A, B. A support 74' for a pivot pin 76 is integral with carriage 74. The axis of the pin 76 is horizontal and at right angles to the mandrel F axis. On said pivot pin a cross 78 is mounted which, in the illustrated case, involves four arms 80 (FIGURE 11). Each one of the arms of cross 78 is fitted with a member for tightening the pistons made up (FIGURES 14-15-16) of clamps 82, 82' opposite each other and integral with toothed rods 84, 84' which engage gear wheel 85.

Rotational motion of wheel 85 in either direction is controlled by piston 86 whose toothed rod engages with a gear wheel 87 integral with said wheel 85 through the small shaft 88. Piston 86 is subjected to the action of a fluid conveyed into a chamber 86' whose cylinder is machined into the arm 80; said action being opposed by a spring 89 placed in cylinder 90.

Of course the pressure and the spring act so as to open and close, respectively, the clamps in order to make free and lock the piston or the workpiece on the cross.

Pressure chamber 86' of each cylinder is connected to a conduit 94 machined in the cross 78 and during its rotation this latter can be connected to slots 95, 95' of suitable angular width made in a suitable position at the periphery of pivot 76. This latter is provided with radial and axial holes 96 connecting the slots 95, 95' to a pressure distributor in order to thus actuate in due sequence one or both groups of clamps 82 involved in the cross.

To the pivot 76, between the cross 78 and the support 74' a wheel with saw teeth 100 is keyed, whose number is a function of the number of arms 80; in the described embodiment, the number of teeth of said wheel is twelve.

Small spring and counterweight pawls 106, 108, 109 are housed in a slot 102 machined in a suitable position of a bracket 104 integral with the guide plate 70 in such a way that the teeth of said small pawls protrude out of the slot 102 to thus engage in sequence the teeth of wheel 100, when carriage 74 shifts in the direction of the arrow of FIGURE 13.

An angular locking member is placed between carriage 74 and cross 78 in order to ensure every time the exact angular position of arms 80 of said cross. Said locking member is illustrated in FIGURE 12 and involves a spring latch 101 slidable in a seat provided in the bracket 74. Latch 101 ends at the other extremity with a roller 103 co-operating with a shaped guide 105 secured to the bracket 104.

It follows therefrom that when carriage 74 shifts in the direction of the arrow of FIGURE 13, said latch 101 is made free and one of the teeth of wheel 100 engages with the small pawl 109 to impart to cross 78 a first angular shifting of 30°; subsequently two further teeth of said wheel by engaging themselves with small pawls 108, 106 impart an overall rotation of 90° to said cross. The piston which is held by clamps 82 is arranged so that its axis becomes aligned with the mandrel F axis as will be described hereinafter.

Workholder mandrel F illustrated by FIGURE 9 involves a frame 110 suitably secured to the workholder table $R_1$ of the grinding machine R. Said frame comprises a support head 112 holding through suitable bearings 114 a bored shaft 116 onto which a control pulley or wheel 118 is keyed in order to impart a rotation to said shaft. In its forward position the shaft 116 has a conical hole housing a conical sleeve 120, which holds a ring 122 provided with a peripheral abutment for engaging the end rim of the piston to be machined. In the hole of the sleeve 120 a countersleeve 124 is inserted with a spring 125 interposed between said sleeve and counter-sleeve. Keys 126 are provided at the other ends of sleeve 120 and counter-sleeve 124 so that these parts will be connected torsionally but axially free. Counter-sleeve 124 terminates at its free extremity with a crown 128 axially slidable inside the ring 122. Integral with said crown 128 is a hollow head 130. This head is closed by a cap 132 in the recess of the crown. Head 130 has a diametrically disposed hole wherein two small pistons 134 slide, whose protruding ends are engageable in the gudgeon pin openings of the piston.

The small piston pins 134 end at their adjacent extremities with inclined planes for pins 135, which engage in the arms of a stirrup 136 associated with a rod 138 slidably inserted in the counter-sleeve 124.

At the other end of shaft 116 a cylinder 140 is secured wherein a piston 142 slides, said piston being fastened to the rod 138. Cylinder 140, which is mounted for axial and rotational movement with said shaft 116, is supported so as to be allowed to rotate in a bush 144 supported by a bracket 145 associated with frame 110.

Bush 144 is provided with threaded holes 146, 148 connecting both chambers of cylinder-piston group 142–140 with a pressure distributor (not illustrated), as will be hereinafter described.

A disc 150 is keyed to the shaft 116. Disc 150 has a positioning notch 152 for a latch 154 which is slidably mounted in a housing 155 supported in suitable position by the bracket 145. Said latch is fitted with a rack which is operatively connected by means of a pinion gear 156, with a rack occurring in the small piston 160, whose cylinder 162 is machined in the bracket 145.

The small piston 160 is biased on the one side by a helical spring 164 and on the other side by the pressure which may be set up in a chamber 166 connected to a distributor, in order to apply a determined pressure to the piston 160.

From the foregoing disclosure the operation of the just described device is apparent. It must be borne in mind that the various driving parts of the device are controlled and actuated in due sequence by means of suitable block and enabling circuits of the hydraulic and/or electric type.

Hydraulic circuits end at a distributor actuated in due sequence in order to establish the communications either among the pressure chambers of the different cylinder-piston groups or with the pressure source or discharge, respectively. Electric circuits are controlled by contacts (microswitches) either directly or through relays; these latter too are actuated in due sequence with respect to the distributor as associated with the hydraulic controls.

Pistons to be ground are placed on the conveyor A so that their axes are horizontal, and are allowed to advance in the direction of the arrows indicated in FIGURE 1. They slide along the cage guide which turns said pistons through 90° so as to arrange them on a platform with their axes vertical.

Figure 2:
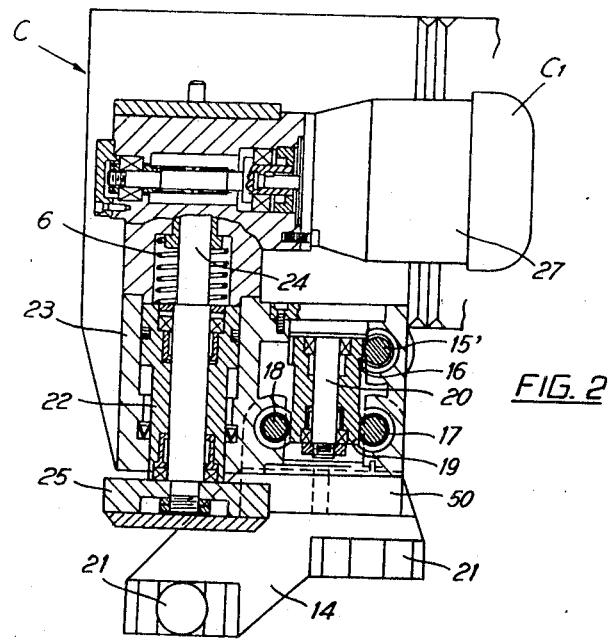
FIGURE 2 is a longitudinal section of the positioning member.
Figure 3:
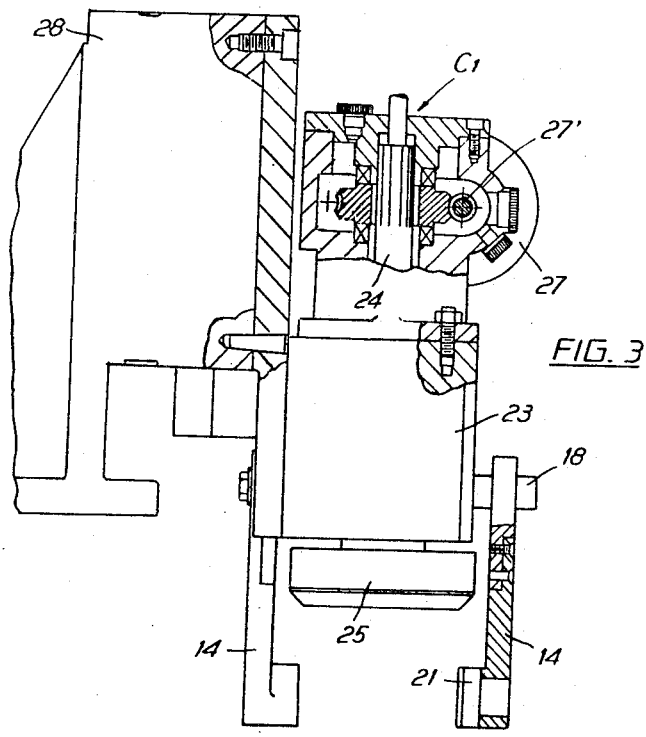
FIGURE 3 is a cross sectional view of the member shown in FIGURE 2.
Figure 5:
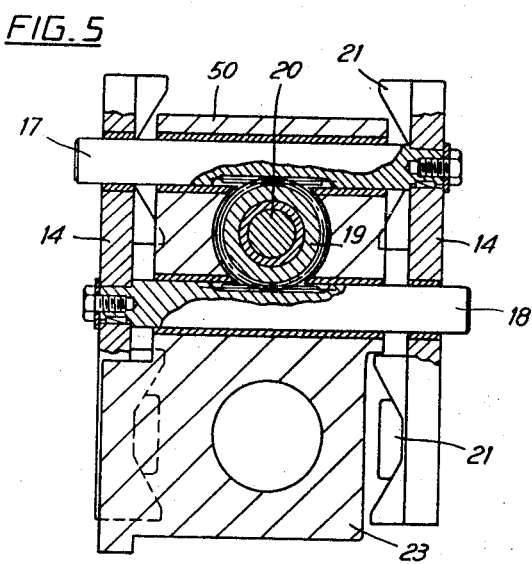
FIGURES 5 and 6 are horizontal cross sectional views of the member shown in FIGURE 2.
Figure 4:
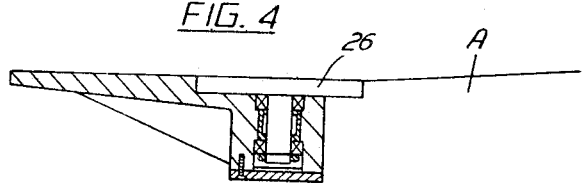
FIGURE 4 is a cross sectional view of a platform whereupon the piece rotates in order to be positioned.
Figure 6:
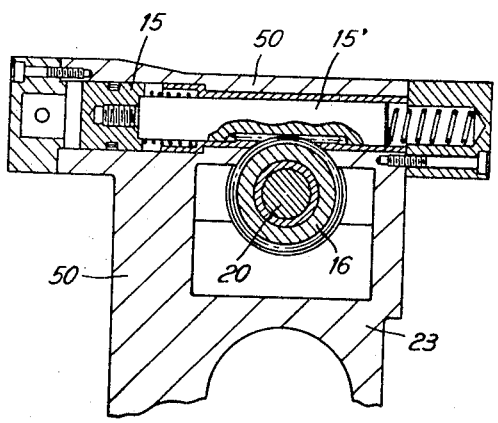

The so oriented pistons at the end of the chute are held by suitable spring stops and then undergo a first translation through the clamps 21 of FIGURE 2 which conveys them to the platform 26 of FIGURE 4.

At this moment the positioning element $C_1$ of the member C lowers, while small motor 27 starts to put in rotation the disc 25 (FIGURE 2), which engages and rotates the piston placed on the platform 26 of FIGURE 4. At the same time clamps 14 close and engage the shaped surfaces 21 in the gudgeon pin holes; in this way the piston is held with the pin axis parallel to the axis of the clamps.

After having so oriented the piston, under the control of a pressure fluid, clamps 21 open again and the element $C_1$ comes back to its upper position.

Translation member C then shifts so as to bring the element $C_2$ with the axis thereof registering with the axis of the piston placed on the platform 26.

In this position the axis of cylinder-piston unit 38–40 is aligned with the axis of small shaft or pivot pin 88 (FIGURE 11) as formed on the arm 80 of cross 78, said arm 80 being horizontal and near the grinding machine mandrel F.

In the machine operation cycle, when the distributor is actuated, a fluid under pressure is conveyed to the upper chamber of the cylinder-piston unit 39–41, so that the head 48 of said unit will be lowered and carried at the previously ground piston held by the left side arm 80 (FIGURE 8) of cross 78. After reaching said position, the distributor is actuated again for feeding firstly the cylinder-piston units actuating the clamps 48' (49') of the heads 48 (49) in order to engage at their holes the ground piston (carried by the already considered arm 80) as well as the piston to be ground placed on the platform 26 of FIGURE 4.

Subsequently the feeding of the cylinder-piston unit 39–41 is reversed in order to carry back the head 49 to the initial position, while the clamps 48', 49' locking the workpiece are kept constantly in the locked position. After this operation, the control 34 is actuated so as to shift carriage 32, namely from right leftwards (FIGURE 1), until aligning the cylinder-piston unit 38–40 with the axis of the shaft 88 of the previously considered arm 80; as a result the ground piston held by clamps 49' is carried to the inlet of the conveyor B. The subsequent distributor operation feeds the cylinder-piston unit 38–40 in order to lower the piston to be ground, which is held by the clamps 48', so as to insert it between the clamps 82 (previously opened) of the arm 80 of cross 78. The distributor is again actuated in order to connect clamps 48', 49' with cylinder-piston units in order to make free both the ground piston and the unground piston. After this operation, the cylinder-piston unit 38–40 is raised and the control 34 is actuated in the opposite direction in order to again bring carriage 32 back to its initial position.

Considering now the operation of the transfer member D, this, besides rotating around the axis of pin 76, can move along the guides 72. Considering the previously exposed operation cycle, when the distributor actuates the clamps 82 to engage them with the pistons, it conveys fluid under pressure into the pressure chambers of cylinders 90 which are connected to the groove 95 and associated with the horizontal arm 80 and lower vertical arm. In this case, both groups of clamps 82 are separated against the associated springs 89, one freeing the ground piston and receiving, in the subsequent step, the piston to be ground held by clamps 48', and the other receiving the ground piston from the mandrel F. When the clamps 48 are spread apart, the pressure in the chambers 86' of both arms 80 is cut off and springs 89 act on clamps 82 to lock the piston. When this operation has been performed, carriage 74 is shifted along the guides 72 to engage the teeth of the wheel 100 and the small pawls 106 and 108–109 to impart thus to the cross an angular shifting of 90°. The piston which has been previously laid from the clamps 48' between the clamps 82 of the horizontal arm is so positioned that its axis registers substantially with the axis of mandrel F. Thereafter carriage 74 is shifted in the opposite direction to the just considered one to thus insert so the base of the piston to be ground on the abutment as formed on ring 122 of mandrel F.

The piston 142 (FIGURE 9) is then actuated in order to shift the stirrup 136 from right to left. By means of the shaped slots occurring in said stirrup, both small piston pins 134 are radially shifted in opposite directions to be inserted in the hole of the considered piston. In the meantime the draught action exerted by piston 142 on the rod 138 is transmitted also to the head 130 and the small piston pins 134 press the piston to be ground against the abutment of ring 122 and hold it there. Said draught action is transmitted also by the sleeve 120 to the conical seat of shaft 116, so that these parts form thus a rigid structure which is coaxial with the shaft 116. During this operation the shaft 116 and all the just considered parts are held in a predetermined angular position by the latch 154 engaged in the notch 152 of disc 150, when the mandrel rotation is stopped in order to thus ensure the exact position of the hole of the piston to be ground with respect to the mandrel. When the substitution of the ground piston with another to be ground is accomplished, pressure is conveyed into the chamber 160 in order to disengage the latch 154 on the notch 152 and said grinding is carried out in the usual manner and with the desired, either peripherical or axial outline.

When the grinding operation is terminated, namely after one or more turns of the shaft 116, pressure of chamber 160 is discharged so that the spring 164 engages again the latch 154 in the notch 152; subsequently pressure is conveyed to cylinder 140 through the threaded hole or connection 146 in order to shift thus the rod 138 and the stirrup 136 in the direction opposite to the preceding one and to disengage accordingly the small piston pins 134 from the hole of the ground piston. During this operation, both chambers 86 which are connected through the pipes 94 to the slot 95 are simultaneously placed under pressure, in order to open thus both groups of clamps 82 associated with both considered arms 80. Carriage 74 is shifted towards mandrel F to engage the head of the ground piston between clamps 82 of the vertical arm 80, while the cylinder-piston unit 38–40 places a new piston to be ground between the clamps 82 of the horizontal arm 80.

Subsequently the pressure in both considered chambers 86 is discharged, so that the respective springs 82 lock the clamps 82 to the already considered two pistons. Afterwards, carriage 74 is allowed to return to the initial position in order to impart a rotation of 90° to the cross 78 and to arrange the piston to be ground on the mandrel F axis. The last of the ground pistons previously arranged between clamps 82 is brought to a vertical position to cause said ground piston to be withdrawn during the subsequent advance strokes of carriage 74 by the transfer member C and laid down on the conveyor B. The previously considered cycle continues automatically for grinding the new piston.

To the described and illustrated device, modifications and changes may be made without departing from the spirit of the invention. My invention may be applied for example to milling machines and other machine tools in order to make the working cycle of these machines automatic.

What is claimed is:

1. A machine tool including means for automatically placing and positioning work pieces on the mandrels of the tool, comprising first and second conveyors for unmachined and machined workpieces, respectively, placed above the work holder mandrel of the machine tool, a first transfer member positioned between the discharge end of the first conveyor and the charge end of the second conveyor, said transfer member having at least one holding and positioning device and two holding and translation devices for holding the machined workpiece and the unmachined workpiece, a second transfer member interposed between said first transfer member and the work holder mandrel, said second transfer member being provided with supports for the workpieces and with control means for imparting a rotary movement to said supports, said means being responsive to the reciprocatory movement of said second transfer member, so that the workpieces withdrawn from the first conveyor are positioned with their axes in alignment with the axis of the mandrel in order to be held by the latter in a predetermined angular position ready for machining.

2. A machine tool according to claim 1, wherein means are associated with the first conveyor for moving the horizontally arranged workpieces through 90° to arrange them individually on a platform with their axes vertical.

3. A machine tool according to claim 1 wherein the first transfer member has a carriage movable along guides interposed between the outlet and inlet of both conveyors, said carriage having at least two cylinder piston units with their axes parallel and at right angles to said mandrel axis and whose movable parts have clamping means for engaging surfaces formed in the correct angular positions on the workpieces in order to angularly position the latter.

4. A machine tool according to claim 1 wherein clamp means of cylinder-pistons units of the first transfer are each provided with at least two clamps having guide members and driving members rotatably connected, said clamps presenting reference members engageable with reference surfaces presented by a workpiece and activated by operation means acting on rotating coupling provided by said head.

5. A machine tool according to claim 3 wherein a bush is associated with the locking means provided in the movable part, said bush holding a shaft associated with a driving disc which is positioned opposite to a platform on which are placed the workpieces.

6. A machine tool according to claim 1 wherein the second transfer member includes a carriage, a cross supported by said carriage and provided with holding members for the workpieces, members positioned between the said cross and the guides for the carriage, in order to angularly position and impart to said cross step-by-step angular displacement which sequentially bring the holding members at the mandrel and at the first transfer member.

7. A machine tool according to claim 6 wherein a pivot pin is associated with the carriage of the second transfer member for supporting the cross in such a way as to allow rotation thereof, there being provided a sawtoothed wheel associated with said cross and three pawls arranged along said guides which sequentially engage the teeth of said wheel and thus move the cross to the correct angular position.

8. A machine tool according to claim 6 where each one of the cross arms has two clamps operatively connected to a movable member for holding the workpiece, so that the axes of said clamps are substantially sequentially aligned with the mandrel axes and with the holding device associated with the first transfer member.

9. A machine tool according to claim 6 including a plurality of cylinder piston units for actuating the holding members of the cross, spring means acting on one side of the movable parts of said units for closing said holding members, a pressure fluid distributor arranged between the cross and the associated support for hydraulically connecting and in sequence a part of the pressure chambers of said units with the pressure fluid source.

10. A machine tool according to claim 8 which comprises at least one slot provided in a suitable angular position at the periphery of the pivot pin of support for the cross and having such an angular width as to involve one of the pressure chambers of the cylinder piston units for holding members presented by said cross, the arcuate groove of which is connected with the pressure source through ducts provided a pivot and with the pressure chambers between said units by means of ducts provided in an angular position of the arms of the cross.

11. A machine tool according to claim 1 wherein the activating member of the clamp means for the mandrel is provided with co-ordinating members connected with positioning means of the driving mandrel for effecting the intervention of said latter means when the mandrel is not working and rests in a predetermined angular position.

12. A machine tool according to claim 1 including radial clamp means provided by the mandrel and cooperating with one of the relative angular reference surfaces presented with one of the relative angular reference surfaces presented by the workpiece in order to position the latter on the mandrel in a predetermined angular position.

13. A machine tool according to claim 1 wherein the movable part of the reciprocating engine for the mandrel is operatively connected with radial latches which engage the bores provided radially on the workpiece or positioning the latter angularly with respect to the mandrel.

References Cited

UNITED STATES PATENTS

| 2,835,082 | 5/1958 | Green | 51—215 X |
| 2,838,884 | 6/1958 | Balsiger et al. | 51—215 |

OTHELL M. SIMPSON, Primary Examiner

U.S. Cl. X.R.

214—1